United States Patent [19]

Laufer

[11] 4,142,217
[45] Feb. 27, 1979

[54] SWITCHING DEVICE FOR A TAPE RECORDER

[75] Inventor: Helmut Laufer, St. Georgen, Fed. Rep. of Germany

[73] Assignee: Dual Gebrüder Steidinger, St. Georgen, Fed. Rep. of Germany

[21] Appl. No.: 842,409

[22] Filed: Oct. 17, 1977

[51] Int. Cl.² ............................................. G11B 15/10
[52] U.S. Cl. .......................................... 360/90; 360/96
[58] Field of Search .................... 360/90, 93, 96, 105, 360/137, 74

[56] References Cited

U.S. PATENT DOCUMENTS

| | | | |
|---|---|---|---|
| 3,305,187 | 2/1967 | Atsumi | 360/96 X |
| 3,458,158 | 7/1969 | Ohira | 360/96 X |
| 3,819,128 | 6/1974 | Hori et al. | 360/96 X |
| 3,867,722 | 2/1975 | Syohji | 360/96 |
| 4,031,556 | 6/1977 | Ban et al. | 360/74 |
| 4,071,865 | 1/1978 | Nakasuna | 360/105 |

Primary Examiner—John H. Wolff
Attorney, Agent, or Firm—Martin A. Farber

[57] ABSTRACT

A tape recorder with a motor-containing-drive device for normal forward running (record or playback) and for fast rewinding of the recording tape, and a carrier plate on which the magnetic heads are arranged. The carrier plate is displaceable in its plane with the corresponding drive device of the tape by operating elements for setting of the operating modes "record" or "playback," whereby by the displacement of the carrier plate into its operating position, a switch, which sets the motor of the drive device in operation, is closed and by which the magnetic heads are brought into engagement on the recording tape. The operating elements for the fast rewinding are set for a displacement of the carrier plate however only over a portion of its displacement path. The switch for the motor current is coupled with the carrier plate such that it closes with the displacement of the carrier plate over this portion of its displacement path in the direction of the operating position of the carrier plate.

5 Claims, 2 Drawing Figures

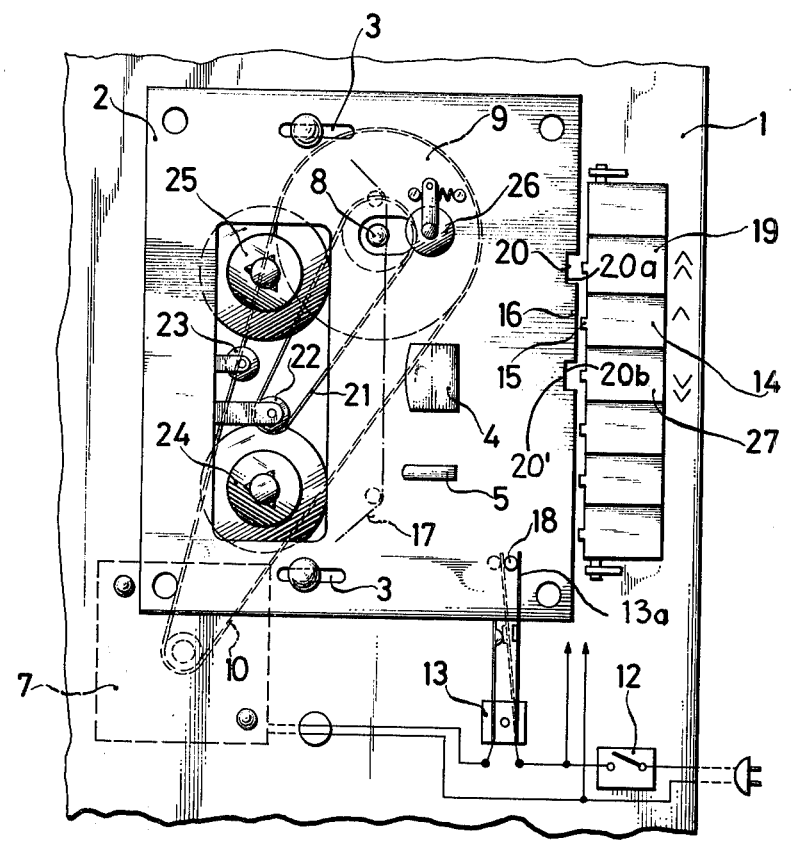
FIG. 1
FIG. 2
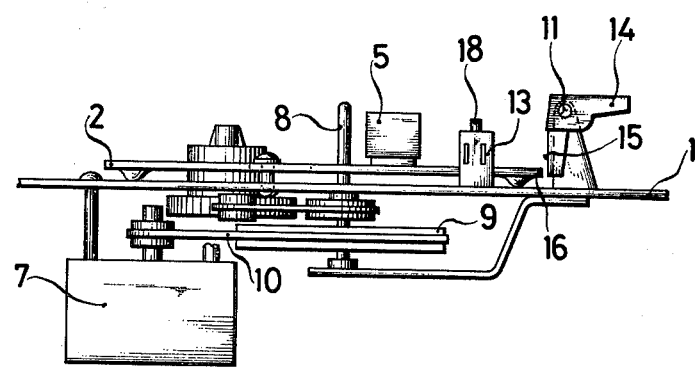

SWITCHING DEVICE FOR A TAPE RECORDER

The invention relates to a switching device for a tape recorder with a motor-containing-drive device for the normal forward running (record or playback) and the fast rewinding of the recording tape, and with a carrier plate on which the magnetic heads are arranged and which is displaceable with the corresponding drive device of the recording tape in its plane by means of operating elements for setting the operating conditions "record" or "playback", whereby by means of the displacement, a switch which sets the motor of the drive device in operation is closed and by means of which the magnetic heads are brought into engagement on the recording tape.

It has proven suitable to turn on the drive motor, not with the main switch of the device, but rather first with an operating element which determines the operating mode of the device at the prevailing time. Since for "record" and also for "playback," the capstan idler and the magnetic head must be brought into operating position, it is expedient to couple the motor switch with the carrier plate for these elements, since otherwise a connection to the motor switch would be required by each of the two operating elements. Since during fast rewinding the carrier plate is not allowed to be brought into operating position, with the known arrangements there is required an additional connection to the motor switch from both the operating elements for fast forward or rearward rewinding.

It is an object of the present invention to simplify the switching device for a tape recorder of the above-mentioned type. This task is solved as set forth herein. It is based on the recognition that as a result of the extension of the carrier plate as a rule over the entire range of the operating elements, without any particular additional expense, the carrier plate simultaneously can be used as a shift rail which is to be reached by each of the operating elements, the latter being formed conventionally as pushbutton keys. This however is not possible without more, since the carrier plate per se is not allowed to be brought into the operating position during fast rewinding.

It is another object of the invention to provide a switching device for a tape recorder with a motor-containing-drive device for the normal forward running (record or playback) and the fast rewinding of the recording tape, and with a carrier plate on which the magnetic heads are arranged and which is displaceable with the corresponding drive device of the recording tape in its plane by means of operating elements for setting the operating conditions "record" or "playback," whereby by means of the displacement, a switch sets the motor of the drive device in operation is closed and by means of which the magnetic heads are brought into engagement on the recording tape, characterized by the following cooperative features. The operating element(s) (19, 27) for the fast forward and rewind are also set for a displacement of the carrier plate (2). They displace the latter however only over a portion of its displacement path. The switch (13) for the motor current is coupled with the carrier plate (2) such that it closes upon the displacement of this carrier plate in this portion of the displacement path in the direction of the operating position of the carrier plate (2).

With the above and other objects and advantages in view, the present invention will become more clearly understood in connection with the following detailed description of a preferred embodiment, when considered with the accompanying drawing, of which:

FIG. 1 illustrates a part of a drive device for a tape-cassette device in plan view; and FIG. 2 schematically illustrates a corresponding side view of FIG. 1.

Referring now to the drawings a carrier plate 2 is displaceably mounted on the base plate 1 of the device by guide means 3. The magnetic heads 4 and 5 and a capstan idler 26 are arranged on the carrier plate 2. On the base plate 1 of the device, in addition, the drive motor 7 is secured thereto and the capstan 8 with its centrifugal or fly wheel mass 9 is mounted. The latter is driven from means of a belt 10 by the motor 7, constituting a first drive means for the tape during playback. The fly wheel mass 9 in turn drives a drive roller 22 via a belt 21, which drive roller 22 is coupleable either directly, or via an intermediate gear 23, with one of the two spool supports 24, 25 constituting a second drive means for the purpose of the fast windings. The base plate of the device contains operating service elements formed as pushbuttons 14, 19, 27 which are can be tilted about an axle 11.

The illustrated position corresponds to the neutral or starting position of the drive device. Upon placing the device into operation, first of all the device switch 12 which connects the device with the power mains system is switched on. The drive motor 7 however still has no current since the motor switch 13 at first is still opened. If the pushbutton 14 which serves for recording or playback is pressed, then it pushes the carrier plate 2 by means of its driver 15 against the abutting edge 16 of the carrier plate 2 and displaces the latter into its operating position. In the operating position, the capstan idler 26 abuts against the capstan 8 and the recording tape 17 abuts against the sound heads 4, 5. By means of this displacement, simultaneously, a pin 18 (which pin is secured on the carrier plate 2) is moved and permits the contact spring 13a which abuts thereagainst to close the motor switch 13. If, for example, the pushbutton 19 for the fast forward running is pressed, then its driver 15 at first moves a bit into the open space formed by the recess 20a adjacent thereto until it pushes against the adjacent edge 20 of the carrier plate 2; consequently the carrier plate 2 does not move up to its operating position. The pin 18 of the carrier plate 2 is arranged with respect to its position relative to the motor switch 13 such that this course of movement (dashed illustrated position) suffices to close motor switch 13.

The carrier plate 2 is displaced in the same manner when the pushbutton 27 for the fast rewind is pressed. In this respect the carrier plate 2 is likewise formed at its adjacent edge 20' with a recess 20b adjacent the driver 15 of the pushbutton 27. The illustrated example contains a device switch 12, with which the conventional electrical units of the device are switched on. It is naturally also possible to do away with this switch and to switch the related devices on and off, respectively, with the switch 13 for the motor.

I claim:
1. A tape playback device comprising
   first drive means for driving a recording tape for playback,
   second drive means for driving the recording tape for fast winding,
   a motor means for being selectively operatively coupleable with said first and second drive means for driving the recording tape, respectively, said motor means including a motor circuit, a magnetic head means for playback of sound events, a carrier plate constituting a carrier for said magnetic head means and arranged displaceable in its plane, a first operating element means arranged for bringing said first drive means into operation with the tape and for displacing said carrier plate through a first displacement to a first operating position wherein the tape abuts said magnetic head means, second operating element means arranged for bringing said second drive means into operation with the tape and for displacing said carrier plate to a second operating position the latter constituting a portion of said first displacement to said first operating position, switch means for closing said motor circuit, said switch means being coupled with said carrier plate such that said switch means is closed when said carrier plate is displaced into said first and second second operating positions, respectively.

2. The tape playback device as set forth in claim 1, wherein
said carrier plate is formed with an edge adjacent said operating element means, said operating element means are pivotally mounted and include driver means for abutting said edge of said carrier plate for displacing the latter upon pivotal actuation of said operating element means,
said edge is formed with recesses adjacent said second operating element means, the latter constituting means for operatively coupling said motor means with said second drive means for the fast winding.

3. The tape playback device as set forth in claim 2, wherein
said second operating element means constitutes a manually selectively actuatable fast forward selector pushbutton and a fast rewind selector pushbutton, and
said first operating element means constitutes a manually selectively actuatable playback selector pushbutton,
said driver means are integral portions of said operating element means, respectively, forming an L-shaped double armed lever therewith, said driver means for directly pushing said edge of said carrier plate when said pushbutton is actuated.

4. The tape playback device as set forth in claim 1, wherein
said switch means includes a contact spring having thereon a first contact of said motor means,
a pin mounted on said carrier plate,
said contact spring abuts said pin,
said switch means includes a second contact of said motor means disposed adjacent said first contact,
said first and second contacts are spaced apart in an inoperative position of said carrier plate and contact each other in both said first and second operating positions.

5. The type playback device as set forth in claim 1, wherein
said switch means for closing said motor circuit constitutes a sole operative switch for closing said circuit,
said first and second operating element means both for displacing said carrier plate in said displacement path in a same first direction to both said first and second operating positions, respectively,
said carrier plate having an inoperative position in an opposite direction from said first direction, said inoperative position of said carrier plate constitutes a different position of said carrier plate from said first and second operating positions,
said switch means for being open so as to open circuit said motor circuit when said carrier plate is in said inoperative position,
said second operating position is located between said first operating position and said inoperative position of said carrier plate.

* * * * *